INVENTOR.
LESTER M. DAVIS

BY

ATTORNEYS.

United States Patent Office 3,127,694
Patented Apr. 7, 1964

3,127,694
FISHING SPINNING LURE
Lester M. Davis, Tacoma, Wash., assignor to Les Davis Fishing Tackle Co., Tacoma, Wash., a corporation of Washington
Filed June 20, 1962, Ser. No. 203,970
6 Claims. (Cl. 43—42.19)

This invention relates to a fishing lure, and more particularly to the class of fishing lure commonly termed "spinner" and being characterized by a wire shaft or stem and a spinning element or blade which rotates or spins about the wire shaft or stem when the lure is pulled through the water. The principal object of this invention is to provide a new and improved spinning element or blade for a fishing lure of this type.

An object of this invention is to provide a spinning element which, due to its particular configuration, will spin immediately upon hitting the water.

The spinning element of a spinner which has been cast or thrown into the water, will assume a position against the wire shaft or stem while the spinner is traveling through the air. A common fault existing amongst spinners of previous design is that the spinning element remains in a position against the wire shaft or stem even after the lure is in the water and is being reeled in, resulting in no rotation of the spinning element and, consequently, no attraction to the fish. Such fault can be directly attributed to the configuration of the spinning element which produces a differential between the water pressures acting against the two sides of the spinning element which is insufficient to produce the lateral force necessary to move the spinning element away from the wire shaft out into a spinning position. It is an object of this invention to provide a spinning element which is configured to produce a pressure differential which is sufficient to create the lateral force required to move it away from the wire shaft out into a spinning position.

Another object of this invention is to provide a spinning element whose configuration includes a recessed trailing edge which generates sound waves and radiates them outwardly into the water when rotating, such a sound may be referred to as a "buzzing noise," and appears to be especially attractive to the fish.

A further object of this invention is to provide a spinner type fishing lure comprising a wire shaft or stem adapted to be connected at one end to a fishing line and at the other end to a fish hook and a spinning element mounted for rotation about said wire shaft or stem and having a flat, generally oval shaped top portion; flat and narrow, generally crescent shaped base strips extending longitudinally along and being both outwardly and laterally spaced from the top portion; smoothly curved body surfaces connecting the base strips to the top portion; and a rearwardly directed recess, with the plane of the flat, generally oval shaped top portion being directed at an angle to the plane of the base, the deflection being from the shaft or stem end outwardly towards the recess end, and such spinning element having a heart shaped outline configuration with each of the aforementioned features cooperating to provide a spinner type fishing lure having improved spinning action and constituting an attractive and tantalizing lure to all kinds of game fish when drawn through the water.

Other objects and advantages will be apparent from the following description, appended claims and annexed drawing.

Referring to the drawing wherein like reference characters designate like parts throughout the several views.

Figure 3:
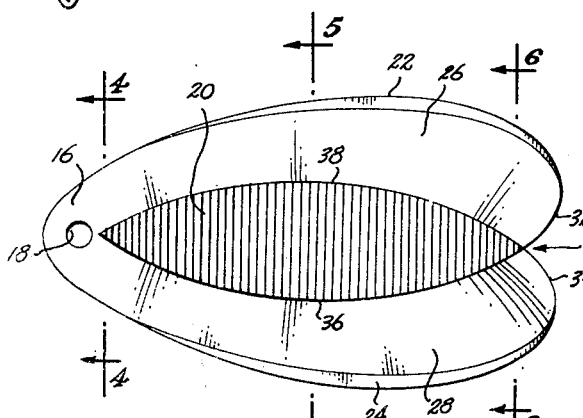
FIG. 3 is a top plan view of the spinning element showing the overall heart shaped outline configuration, the oval configuration of the top portion, the crescent shaped configuration of the base strips and the configuration of the rearwardly located recess.
Figure 6:
Figure 7:
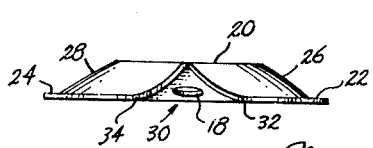

FIG. 6 is a sectional view taken along line 6—6 of FIG. 3 and showing the transverse configuration of the spinning element immediately rearward of the recess end of the top portion and including the flat transverse configuration of the base strips and the generally arcuate transverse configuration of the metal surface between the base strips; and FIG. 7 is an end elevational view of the recessed end of the spinning element, showing the lines defining the recess and the manner in which they ascend from the plane of the base to the plane of the top portion as they curve toward each other.

Figure 1:
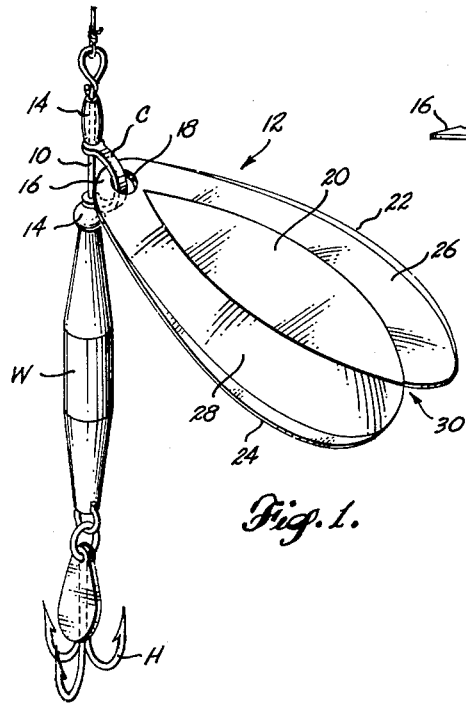
FIG. 1 is a perspective view illustrating a complete spinning lure which has been constructed in accordance with teachings of the present invention.
Figure 2:
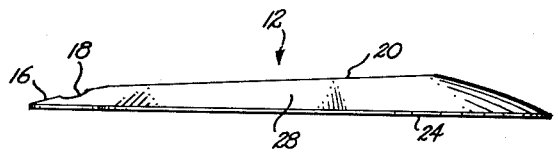
FIG. 2 is a side elevational view of the spinning element, showing the angled relationship of the top portion with respect to the base.

Referring now to FIG. 1, the numeral 10 designates a shaft or stem of wire on which the spinning element 12 of the present invention is mounted for rotation. The lower end of the shaft or stem end may carry one or more hooks H to which there may be applied, a fly, streamer, fish eggs, minnows, worms, feathers, etc. The other end of the shaft or stem 10 is adapted for connection to a fishing line; and both above and below the spinning element 12, the usual bead 14 may be applied to the shaft or stem 10 in a manner familiar to those skilled in the art.

The spinning element 12 has a generally heart shaped outline (when viewed in plan, see FIG. 3), with the point end 16 being mounted for rotation about the shaft or stem 10 by means of an aperture 18 and a clevis C. Of course, it must be realized that such manner of affixing spinning element 12 onto shaft 10 for rotation thereabout is merely illustrative of one of many possible arrangements and is therefore nonlimitive.

Figure 4:
FIG. 4 is a transverse sectional view taken along line 4—4 of FIG. 3 and showing the generally arcuate transverse configuration of the spinning element at the location immediately forward of the shaft end of the top portion.
Figure 5:
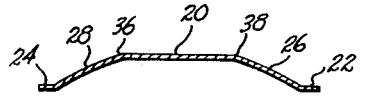
FIG. 5 is a transverse sectional view taken along line 5—5 of FIG. 3 and showing the transverse configuration of the spinning element at that location including the flat transverse configuration of both of the base strips and the top portion, and the arcuate transverse configuration of the connecting body surfaces.

Spinning element 12 has a top portion 20 which is flat and of generally oval shaped outline and is positioned inwardly of the outer edges of the spinning element 12 in both the transverse and longitudinal directions. Flat and narrow, generally crescent shaped base strips 22, 24 extend longitudinally along the opposite side of, and are both outwardly and laterally spaced from, the top portion 20. Filling in between said base strips 22, 24 and the top portion 20 are smoothly curved body surfaces 26, 28. It should be noted that at the shaft end of spinning element 12 the base strips 22, 24 and the top portion 20 each terminate short of the outer periphery of the spinning element 12 at such end and the curved surfaces 26, 28 joint together at such end and give the spinning element 12 a generally arcuate (see FIG. 4) transverse configuration at the location between the end of top portion 20 and aperture 18.

A recess 30 is cut into the end of spinning element 12 opposite from the point end 16, such feature being clearly illustrated in FIGS. 1 and 3. Also, when referring to FIG. 3 notice that the two cut lines 32, 34 which define recess 30 are smoothly curved and run into and form a continuation of the curved lines 36, 38 representing the intersection of curved body surfaces 26, 28 with top portion 20.

The transverse configuration of spinning element 12 as it occurs at the point of intersection of recess lines 32, 34 and curved lines 36, 38 is generally arcuate with the exception of the base strips 22, 24 which are straight and flat (see FIG. 6).

It can readily be seen that if curved surfaces 26, 28 were allowed to continue toward each other and meet along the longitudinal center of spinning element 12, and if recess 30 were not provided, the spinning element 12 would have a configuration which closely resembles that of an inverted teaspoon. Thus, the spinning element 12 of this invention which is provided with a flat top portion 20 might properly be termed a "truncated spoon."

FIG. 7 is an elevational view looking into the recessed end of spinning element 12 and showing the manner in which cut lines 32, 34 start at points located within the plane of base strips 22, 24 and progressively rise as they move together until they intersect at the plane of the top portion 20.

It has been found by experimentation and actual usage that the configuration described above causes the spinning element 12 of this invention to quickly and immediately leave its position adjacent the shaft or stem 12 when the lure hits the water and move outwardly into a spinning position. In addition, it has been observed that the recess 30 generates sound waves when the spinning element 12 is rotating and that such sound waves attract the attention of the fish and cause them to go after the lure.

Another advantageous feature of the spinning element configuration described above is that the flat top portion 20 provides a relatively large reflecting surface which, when the spinning element 12 is rotating, throws out a relatively wide beam of light in a single direction. This is to be contrasted with the conventional completely curved spinning element which reflects light in many widely scattered directions. The relatively wide reflected beam of light is more intense than the several, widely scattered beams of light and can be seen for a greater distance through the water by the fish.

It is proposed that a die be used in the manufacture of this spinning element and that the formation of the base elements 22, 24, the top portion 20 and the curved connecting segment 26, 28, together with the cutting of the heart shaped outline including inset 30 and the punching of the aperture 18 be all performed in a single stamping operation.

The spoon may be constructed from bright nickel, shiny sheet brass, shiny sheet copper, stainless steel or other good light reflecting material. Suggested modifications include making the undersurface of spinning element 12 of a different color than the top surface, e.g., giving the top side a shiny brass appearance and the underside a bright nickel appearance, etc. Further modifications include painting the top portion 20 red, yellow or some other bright and attractive color, as indicated by the shading in FIG. 1. Since the top portion 20 is flat, the paint could easily be applied by a small roller.

Spinning elements such as described may be made in many sizes and with a variation in proportions but the principal features of a flat top portion, crescent shaped base strips and a rearwardly directed recess, must be retained.

I claim:

1. A spinner type fishing lure comprising a wire shaft, a generally heart shaped spinning element including a generally pointed end and a recess end, and means mounting the generally pointed end of said element onto said shaft for rotation of said element about said shaft, such spinning element being of one piece, relatively thin sheet material construction configured to include flat, relatively narrow, generally crescent shaped base strips laterally spaced apart within the same horizontal plane, a flat, generally oval shaped top portion disposed between and laterally spaced above said base strips, and arcuate curved body sections extending between said base strips and the flat top portion and around said top portion in the area of the point end and partially around said top portion at the recess end.

2. A spinner type fishing lure in accordance with claim 1, wherein the flat top portion lies in a plane which is directed at an angle to the plane of said base strips, the deflection of said angle being from the generally pointed end outward towards the recess end.

3. A spinner type fishing lure comprising a wire shaft and an elongated spinning element mounted for rotation about said shaft, said spinning element consisting essentially of flat, relatively narrow, generally crescent shaped base strips laterally spaced apart in the same plane, a flat, generally oval shaped top portion disposed between and spaced outwardly from said base strips, and arcuate curved body sections connecting said flat base strips to said flat top portion.

4. A spinner type fishing lure comprising a wire shaft and an elongated spinning element mounted for rotation about said shaft, said spinning element consisting essentially of flat, relatively narrow, generally crescent shaped base strips laterally spaced apart within the same plane, a flat, generally oval shaped top portion disposed between and spaced outwardly from said base strips, and arcuate curved body sections connecting said flat base strips to said flat top portion, said arcuate curved body sections joining together at one end of said spinning element to form a generally pointed end and giving such spinning element an arcuate transverse configuration at said pointed end, said arcuate transverse configuration both commencing and terminating in the plane of said base strips.

5. A spinner type fishing lure comprising a wire shaft and an elongated spinning element mounted for rotation about said shaft, said spinning element consisting essentially of flat, relatively narrow, generally crescent shaped base strips laterally spaced apart within the same plane, a flat, generally oval shaped top portion disposed between and spaced outwardly from said base strips, and arcuate curved body sections connecting said flat base strips to said flat top portion, said arcuate curved body sections joining together at one end of said spinning element to form a generally pointed end and giving such spinning element an arcuate transverse configuration at said one end, said arcuate transverse configuration both commencing and terminating in the plane of said base strips, with an opening in said pointed end for connecting the spinning element with said wire shaft for rotation thereabout, and with the top portion being disposed within a plane that extends at an outwardly diverging angle relative to the plane of said base strips.

6. A spinner type fishing lure comprising a wire shaft and a spinning element mounted for rotation on said shaft, said spinning element having the configuration of a truncated, heart shaped spoon and comprising flat, relatively narrow, generally crescent shaped base strips laterally spaced apart in the same plane, a flat top portion disposed between and spaced outwardly from said base strips, and inclined body sections connecting said flat base strips to said flat top portion.

References Cited in the file of this patent

UNITED STATES PATENTS

| D. 131,476 | Cook | Mar. 3, 1942 |
| D. 160,643 | Marbourg | Oct. 24, 1950 |
| 281,083 | Kessler | July 10, 1883 |
| 1,837,656 | Crosby | Dec. 21, 1931 |

FOREIGN PATENTS

| 909,191 | France | Dec. 10, 1945 |
| 281 | Great Britain | Jan. 7, 1890 |